(12) United States Patent
Kline

(10) Patent No.: US 10,134,008 B2
(45) Date of Patent: Nov. 20, 2018

(54) DETERMINING COMPATIBILITY OF MULTIPLE SPECIFICATIONS

(71) Applicant: International Business Machines Corporation, Armonk, NY (US)

(72) Inventor: Eric V. Kline, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 407 days.

(21) Appl. No.: 14/859,776

(22) Filed: Sep. 21, 2015

(65) Prior Publication Data

US 2016/0260061 A1    Sep. 8, 2016

Related U.S. Application Data

(63) Continuation of application No. 14/636,253, filed on Mar. 3, 2015.

(51) Int. Cl.
*G06F 11/36* (2006.01)
*G06Q 10/08* (2012.01)

(52) U.S. Cl.
CPC .................. *G06Q 10/0875* (2013.01)

(58) Field of Classification Search
CPC .................. G06F 17/50; G06Q 10/06
See application file for complete search history.

(56) References Cited

U.S. PATENT DOCUMENTS

| | | |
|---|---|---|
| 5,247,651 A | 9/1993 | Clarisse |
| 5,515,269 A | 5/1996 | Willis et al. |
| 5,910,897 A | 6/1999 | Dangelo et al. |
| 7,103,434 B2 | 9/2006 | Chernyak et al. |
| 8,290,499 B2 | 10/2012 | Rappaport et al. |
| 2005/0197789 A1* | 9/2005 | Niermann ............... G06Q 10/06 702/23 |
| 2007/0179643 A1* | 8/2007 | Boger ..................... G06F 17/50 700/83 |
| 2009/0193298 A1* | 7/2009 | Mukherjee .......... G06F 11/0718 714/38.1 |
| 2009/0307335 A1 | 12/2009 | Bantz et al. |

OTHER PUBLICATIONS

"Intelligent Platform Management Interface: Specifications"; Intel Corporation; Printed Jan. 7, 2015; 4 pages; <http://www.intel.com/content/www/us/en/servers/ipmi/ipmi-specifications.html>.
"Intelligent Pluggable System Specification (IPSS): Streamline the design of complete digital signage solutions"; Intel Corporation; Printed Jan. 7, 2015; 5 pages; <http://www.intel.com/content/www/us/en/intelligent-systems/digital-signage/intelligent-pluggable-system-specification.html>.
U.S. Appl. No. 14/636,253, filed Mar. 3, 2015; Entitled "Determining Compatibility of Multiple Specifications".
Appendix P: List of IBM Patents or Patent Applications Treated as Related, dated Sep. 21, 2015, 2 pages.

* cited by examiner

*Primary Examiner* — Talia F Crawley
(74) *Attorney, Agent, or Firm* — Alexander G. Jochym

(57) ABSTRACT

Embodiments of the present invention provide systems and methods for evaluating specification data of two or more components. In one embodiment, informational data, including specifications, provides details on these two or more components. The system then derives a set of interactions within these two or more components. From the informational data, in conjunction with interactions within the two or more components, it is determined whether one or more incompatibility issues exist. In instances where one or more incompatibility issues exist, the issue is highlighted and given a description.

5 Claims, 5 Drawing Sheets

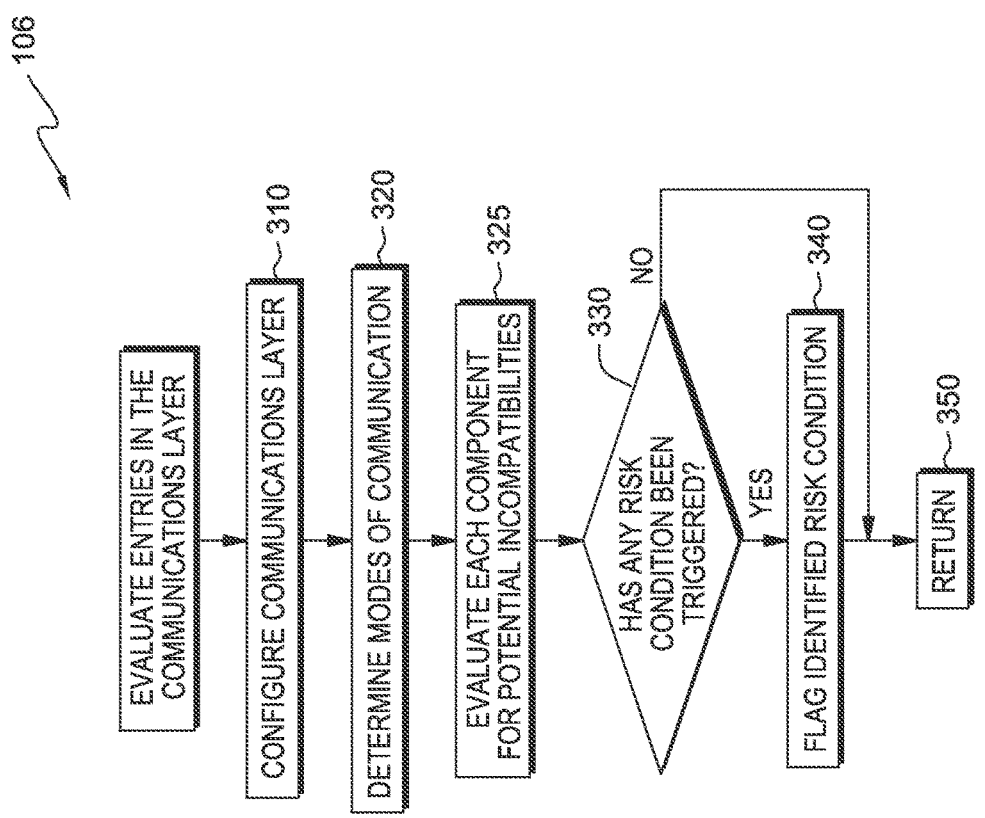

| PART NUMBER | DESCRIPTION | COMPOSITION MATERIAL | INTERACTING COMPONENTS | MODE(S) OF COMMUNICATION | ASSOCIATED CONDITIONS | | ISSUE |
|---|---|---|---|---|---|---|---|
| | | | | | SPECIFICATIONS | STATIC | |
| L3003 | DYE | LIQUID | SOLVENT WIRE | FLUID-CONTACT | $\alpha = 45\ M^{-1}cm^{-1}$ | METAL | |
| N2002 | SOLVENT | LIQUID | DYE WIRE | FLUID-CONTACT | pH = 1.2 | METAL | CHEMICAL CORROSION |
| G1001 | WIRE | AMALGAM | DYE SOLVENT | FLUID-CONTACT | 75% COPPER BY WEIGHT | ACIDIC LIQUID | CHEMICAL CORROSION |

FIG. 4

DETERMINING COMPATIBILITY OF MULTIPLE SPECIFICATIONS

BACKGROUND OF THE INVENTION

The present invention relates generally to the field of product configuration and more specifically to identifying compatibility issues between product specifications having multiple components.

Specifications are an integral part of the engineering field for developing new products. A specification is a type of technical standard in the form of a specific set of explicit requirements (in a good, material, process, service, system, or work) as dictated by a customer, which a vendor delivers to the customer. An engineer (working for the vendor) fields technical requests and in order to draft solutions, he or she must interpret and deliver against simple and complicated specifications. When multiple components (and hence multiple specifications) across multiple modes of contact (e.g., electrical, mechanical, chemical, etc.) are involved, the multiple specifications may not be compatible with each other. The identification and sorting through specification issues are non-trivial matters and are often not apparent, and thus are highly reliant upon the skill, knowledge, and diligence of the engineer.

SUMMARY

According to one embodiment of the present invention, a method for evaluating specification data of two or more components is provided, the method comprising: receiving, by one or more processors, informational data detailing two or more components; deriving, by one or more processors, a set of interactions within the two or more components; evaluating, by one or more processors, the informational data in conjunction with interactions within the two or more components; determining, by one or more processors, from the two or more components, whether one or more incompatibility issues exist; and responsive to determining that one or more incompatibility issues exist, indicating by one or more processors, through an interface, the one or more incompatibility issues.

Another embodiment of the present invention provides a computer program product for evaluating specification data of two or more components based on the method described above.

Another embodiment of the present invention provides a computer system for evaluating specification data of two or more components based on the method described above.

BRIEF DESCRIPTION OF THE DRAWINGS

FIG. 3 is a flowchart depicting operational steps for identifying potential compatibility issues, in accordance with an embodiment of the present invention;

FIG. 4 contains an example of a bill of materials with multiple components and communication criteria entered in with potential issues indicated, in accordance with an embodiment of the present invention.

DETAILED DESCRIPTION

Engineers sort through simple and complex specifications when drafting and designing new products and services. Incompatible specifications are often not intuitive and not apparent to the engineer working on the design project and would require some sort of method(s) to identify such incompatibility issues. Incompatible specifications impede the design process and lead to poorly designed products. Embodiments of the present invention provide systems and methods for identifying incompatibility issues at different stages of the design process by taking into account how components interact with one another.

Figure 1:
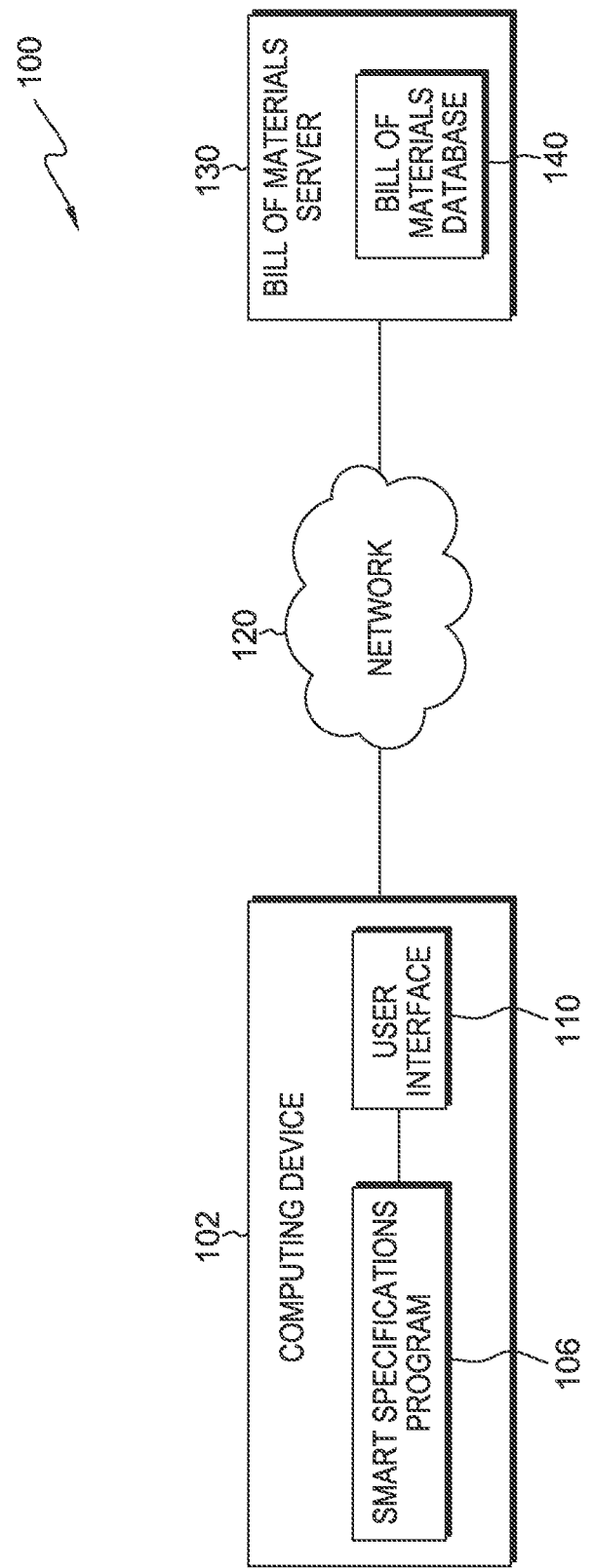
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to environment 100 may be made by those skilled in the art without departing from the scope of the invention as recited by the claims. In this exemplary embodiment, environment 100 includes bill of materials server 130 and computing device 102, interconnected via network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communication between computing device 102 and bill of materials server 130.

Bill of materials server 130 includes bill of materials database 140. Bill of materials server 130 may be a management server, a web server, any other electronic device, or computing system capable of receiving and sending data. In other embodiments, bill of materials server 130 can be a laptop computer, a tablet computer, a netbook computer, a personal computer (PC), a desktop computer, a personal digital assistant (PDA), a smart phone, or any programmable electronic device capable of communicating with client computing device 102, via network 120.

Bill of materials database 140 is a repository which stores information detailing one or more bill of materials. The bill of materials is a list of and the quantities of the raw materials and sub-assemblies needed to construct a product. In other embodiments, bill of materials database 140 can be a database for storing information associated with 3-D design models, architectural and physical designs, and other engineering applications. Data stored on bill of materials database 140 may be updated and/or modified.

Computing device 102 includes smart specifications program (SSP) 106 and user interface (UI) 110. Computing device 102 may be a laptop computer, a tablet computer, a netbook computer, a personal computer (PC), a desktop computer, a personal digital assistant (PDA), a smart phone, a thin client, or any programmable electronic device capable of communicating with bill of materials server 130 via network 120. Client computing device 102 may include internal and external hardware components, as depicted and described in further detail with respect to FIG. 5.

UI 110 may be for example, a graphical user interface (GUI) or a web user interface (WUI) and can display text, documents, web browser windows, user options, application interfaces, and instructions for operation, and includes the information (such as graphic, text, and sound) a program presents to a user and the control sequences the user employs to control the program. UI 110 is capable of receiving data (e.g., one or more bill of materials), user commands, and data input modifications from a user. UI 110 is also capable of communicating with SSP 106.

In this exemplary embodiment, SSP 106 is a software application capable of identifying two or more components, which may be in communication with each other, using a communications layer. SSP 106 evaluates potential compatibility issues among communicating components using a logic component. In this exemplary embodiment, SSP 106 retrieves one or more bill of materials from the bill of materials database 140, identifies communicating components and communication types from the bill of materials, and identifies potential incompatibilities among the communicating components. SSP 106 can output a list of the identified potential incompatibilities among the communicating components. In other embodiments, SSP 106 may be implemented as an application, middle-ware, module, script, or macro.

Figure 2:
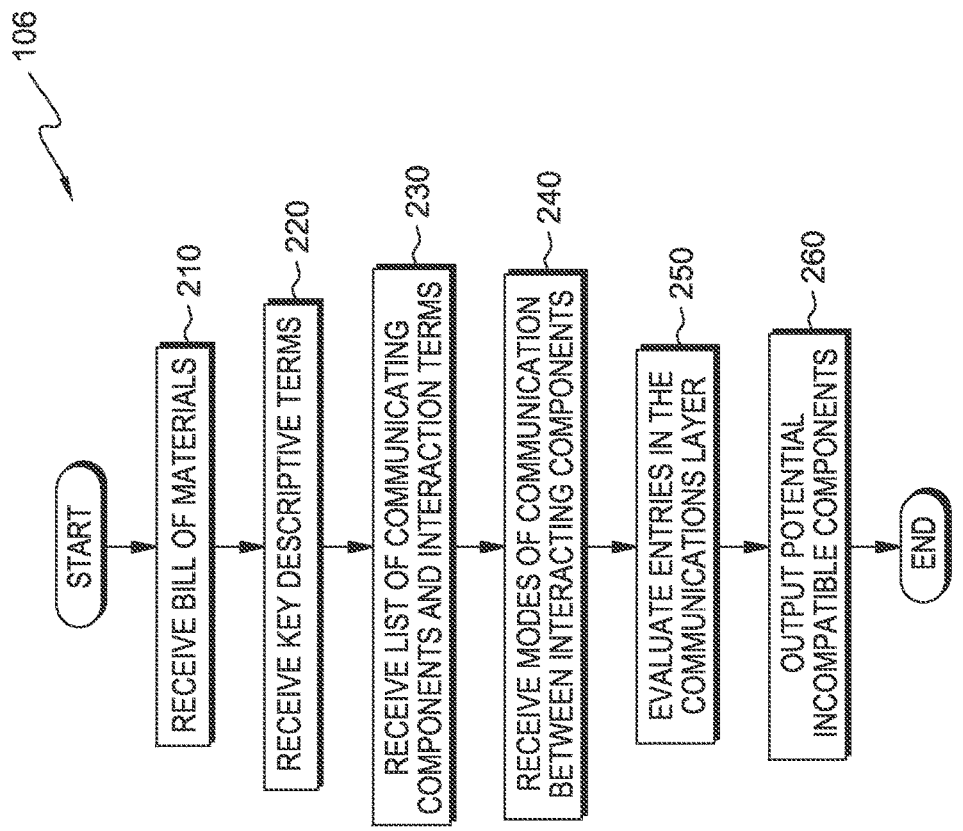
FIG. 2 is a flowchart depicting operational steps for determining potential compatibility issues between multiple specifications using an inputted bill of materials and interaction criteria, in accordance with an embodiment of the present invention.

FIG. 2 is a flowchart depicting operational steps for determining potential compatibility issues between multiple specifications using a bill of materials and interaction criteria, in accordance with an embodiment of the present invention.

In step 210, SSP 106 receives one or more bill of materials for a product. In this exemplary embodiment, SSP 106 receives the bill of materials from a separate database, such as database 140. The bill of materials are the required parts or subassemblies needed to construct a product. For example, a bill of materials to construct a photonic device may include a battery and a coated metal rod, where the coated metal rod has components which include: a solvent, a dye, and a wire, each with its own specification. In other embodiments, SSP 106 receives one or more bill of materials, derived from a user input. In yet another embodiment, SSP 106 receives one or more bill of materials from a combination of a derived user input and retrieval from a database. After receiving the bill of materials, SSP 106 assigns each component a general description. For example, a rubber O-ring may be assigned the general description of "o-ring".

In step 220, SSP 106 receives further descriptive terms of each component within the received bill of materials. In this exemplary embodiment, SSP 106 retrieves a set of descriptive terms, describing the received bill of materials from database 140. For example, the set of descriptive terms may include, but are not limited to, suppliers, part numbers, the material composition of components, and properties of the components (i.e., chemical, electrical, mechanical, etc.). In other embodiments, SSP 106 receives a set of descriptive terms, derived from a user input. In order for SSP 106 to keep detailed accounts of these components, further descriptive terms (in addition to a "general description") can be obtained from the user. SSP 106 can retain a set of descriptive terms associated with bill of materials and/or components in database 140 on server 130. For example, the set of descriptive terms for a wire are "amalgam" (which is a description of the material composition) and "70-75% copper content by weight" (which is a description of a specification). The descriptive terms received from a user input may be added to database 140.

In step 230, SSP 106 receives a list of communicating components and interaction terms within the communications layer from the user. In this exemplary embodiment, SSP 106 identifies which components may interact and relevant terms (i.e., factors) associated with these interactions. For example, a bill of materials consisting of multiple components may have multiple potential interactions between the components. Some of these potential interactions between components (as well as non-interacting components) can be ignored while other potential interactions between components may impede the design process due to incompatible specifications. In the example above, the components (a solvent, a dye, and a wire) interact with one another. In this exemplary embodiment, SSP 106 factors in second, third, and $n^{th}$ order interaction terms. The second, third, and $n^{th}$ order interaction terms are not readily apparent but may have an impact on the interacting components. As more components are involved, the nature of interacting components becomes further complicated and may lead to performance issues (i.e., bottlenecks) during the various stages of production. The skills and/or knowledge of a design engineer may be unable to readily identify potentially complex phenomenon which is non-trivial, non-intuitive, and of at least second order interaction character. In other embodiments, SSP 106 may consider simple, one-variable main effects (e.g., first order terms). For example, a user may consider just a metal component as a variable that dictates conductivity of a device. In this exemplary embodiment, SSP 106 receives new interaction terms from a user input and determines the effects of the new interaction terms on specification compatibility.

In step 240, SSP 106 receives the modes of communication between components within the communications layer. In this exemplary embodiment, SSP 106 factors in multiple modes of communication which appropriately describe the nature of how components interact. The modes of communication can be derived from a user input and/or retrieved from a database, and may include chemical, electrical, mechanical, physical, pressure loading, etc. For example, the mode of communication by which the solvent interacts with the dye to make the coating is chemical. SSP 106 also receives the operational conditions associated with each component. For example, such operational conditions may include static (i.e., constant) and/or dynamic (i.e., changing) conditions.

In step 250, SSP 106 evaluates the entries in the communications layer using the logic algorithm of FIG. 3 to evaluate each component communication for potential incompatibilities.

In step 260, SSP 106 outputs potentially incompatible components and specifications. In this exemplary embodiment, SSP 106 highlights the potential issue(s) with specifications by indicating which particular components are incompatible with each other and a general description of the incompatibility. For example, a description of an incompatibility issue may include "over drive screw" or "galvanic corrosion." In other embodiments, SSP 106 outputs the potentially incompatible components and specifications directly to the bill of materials.

FIG. 3 is a flowchart depicting operational steps for identifying potential compatibility issues, in accordance with an embodiment of the present invention.

In step 310, SSP 106 configures the communications layer. In this exemplary embodiment, SSP 106 obtains a set of terms describing the bill of materials and its components in terms of specifications, material composition, etc.; components potentially interacting with each other; and the data parameter type (continuous or discrete). For example, the set of terms used to describe the coated metal rod in the communications layer are: a solvent, a dye, and a wire (the components); amalgam (material composition of the wire); and the specifications for the solvent, the dye, and the wire. In other embodiments, SSP 106 configures the communications layer by obtaining only the components which interact with each other and passing these components to the communications layer.

In step 320, SSP 106 determines the modes of communication by which the components interact. In this exemplary embodiment, SSP 106 determines viable potential modes of communication between interacting components for an issued bill of materials. For example, in the case of the coated metal rod mentioned above, the modes of communication by which the components interact are fluid contact between the dye and the wire, and chemical contact between the dye and the solvent. Using the entries in the communications layer, SSP 106 determines the relevant modes of communication. Not all modes of communication will be likely between interacting components. For example, where fluid contact and chemical contact are the only likely modes of communications within an exemplary coated metal rod, SSP 106 does not take into account other modes of communication, such as physical loading. However, SSP 106 may account for physical loading in a different coated metal rod as a mode of communication, if a pertinent load on the device is present.

In step 325, SSP 106 evaluates each component for potential incompatibilities. In this exemplary embodiment, SSP 106 analyzes the inputs regarding a bill of materials to determine which specifications are incompatible through a combination and permutations approach. For example, one of the chemical properties of copper metal is that it is sensitive to acid causing copper to corrode over time when in contact with acid. The specification of the solvent needing to have a low pH (thus being acidic) and the specification of the wire needing high copper content would pose a scenario in which the specifications are incompatible. SSP 106 uses logic to select which components interact; sorts through interacting components via polynomial models; evaluates second, third, and $n^{th}$ interaction term considerations through arrays wherein each component and its associated inputs are evaluated under some set of factors for each interaction term; and each interaction term is evaluated for some parameter over some condition.

$$A(j,k) = \begin{vmatrix} P1_x * C1_x & P1_y * C2_y & \ldots & P1_n * C3_n \\ P2_x * C1_x & P2_y * C2_y & \ldots & P2_n * C3_n \\ P3_x * C1_x & P3_y * C2_y & \ldots & P3_n * C3_n \end{vmatrix} \quad \text{Equation 1}$$

More specifically, using Equation 1, each interaction term A(j,k) is evaluated using an array incorporating a combinations and permutations approach for some parameter (P) over some condition (C). For example, a first parameter (i.e., P1) may be evaluated over an n number of conditions (i.e., C1 through $C_n$). Additional parameters (i.e., P2 and P3) may be evaluated over n number of conditions (i.e., C1 through $C_n$), so if there are three (3) conditions (i.e., n equals three (3)), then nine (9) total evaluations are performed for the interaction term, A(j,k), and results are returned for any potential compatibility issues. In other words, multiple evaluations are made for each interaction term in order to find terms which may be associated with incompatible specifications.

In step 330, SSP 106 determines if any risk condition has been triggered. A risk condition is an identifiable condition for a particular mode of communication in which component specifications are incompatible. In this exemplary embodiment, SSP 106 determines the risk conditions for an issued bill of materials. For example, in the case of the coated metal rod described above, one mode of communication is fluid contact. SSP 106 ascertains the specific risk conditions associated within a mode of communication. For fluid contact, SSP 106, having a third order interaction term between the wire, solvent, and dye defined, examines potential incompatibilities under the specified conditions. The fluid contact of a copper based wire in an acidic medium is a potential concern, so this risk condition is triggered. Upon triggering a risk condition, "further conditions" are then associated with the initial condition. These further conditions are a subset of more detailed risk conditions that may be triggered. For example, SSP 106 examines the operational conditions associated with metal surfaces in contact with acid medium at an elevated ambient temperature. As the solvent is acidic and the ambient temperature is elevated, the solvent is incompatible with the metal surface of the wire.

If, in step 330, SSP 106 determines that a risk condition has been triggered, then, in step 340, SSP 106 flags the identified risk condition. In this exemplary embodiment, SSP 106 flags the identified issue by highlighting the components and the incompatible specifications associated with the components. For example, the mode of communication is fluid contact between components—an acidic chemical and a metal surface. Metal is reactive towards acid and thus loses its structural integrity when in contact with acid. A risk condition has been triggered to suggest a potential incompatibility, and the identified issue is flagged by highlighting the acidic chemical and metal surface components, and SSP 106 provides a general description of the issue (e.g., "Chemical Corrosion"). After SSP 106 flags each identified issue, then in step 350, SSP 106 returns to step 260 of FIG. 2.

If, in step 330, SSP 106 determines that a risk condition has not been triggered, then, in step 350, SSP 106 returns to step 260 of FIG. 2. In this exemplary embodiment, SSP 106 determines that a risk condition has not been triggered when the specifications of the components are compatible with each other. For example, an acidic chemical and a glass surface have fluid contact as the mode of communication. The exemplary glass is unreactive towards the acid and thus a risk condition has not been triggered to suggest a potential incompatibility between the components. However, if the acid in the system under evaluation were a highly reactive moiety of, for example, hydrofluoric acid, then a risk condition may be triggered.

FIG. 4 is an example of a table of interactions and associated risk assessments, with an indication of potential compatibility issues, in accordance with an embodiment of the present invention.

Part number column 405 lists the part numbers of the individual components. General description column 410 lists a general description (i.e., a title) of each component. For example, L3003, N2002, and G1001 are the part numbers for the dye, solvent, and wire components, respectively. Composition material column 415 lists the materials frameworks for each component. For example, liquid and amalgam are the materials framework for the dye and wire, respectively. Interacting components column 420 lists the components which interact with each other. For example, the solvent and the dye interact with the wire, thus, for the wire, the entries in column 420 are the solvent and the dye. Mode(s) of communication column 425 lists the mode by which the components interact with one another. For example, fluid-contact is the mode by which the dye, solvent, and wire interact with one another. Specifications column 430a and static column 430b list specific conditions associated with each component. Specifications column 430a lists the specifications of a particular component, and static column 430b lists the constant conditions to which each component is exposed. For example, "$\alpha=45$ $M^{-1} \cdot cm^{-1}$," "pH=1.2," and "75% Copper by Weight" are specifications for the dye, solvent, and wire components, respectively. Issue column 435 lists the nature of a potential issue which has been flagged by SSP 106 (step 340 in FIG. 3). For example, chemical corrosion is a potential issue associated with physical contact between the solvent and the wire.

Highlighted rows 440 is a visual indicator to the user to depict when two or more components in a bill of materials are potentially incompatible with each other, including the incompatible specifications, the general description of the incompatibility issue, and any set of terms associated with the flagged down components. In the exemplary embodiment, the entries in columns 405, 410, 415, 420, 425, 430a, and 430b are received by SSP 106 as inputted parameters that Logic evaluates for potential specification incompatibilities (steps 320 and 325 in FIG. 3) while column 435 and highlighted rows 440 flag potential incompatibility issues by outputting the issue while highlighting the incompatible specification(s). In this exemplary embodiment, the set of components which may be incompatible with each other are outlined. For example, the solvent and wire components are potentially incompatible with one each other (i.e., the low pH specification of the solvent and high copper content specification of the wire), as physical contact between the solvent and the wire may result in chemical corrosion. As the dye component does not have incompatible specification issues with the solvent and the wire, entries associated with the dye are not highlighted.

Figure 5:
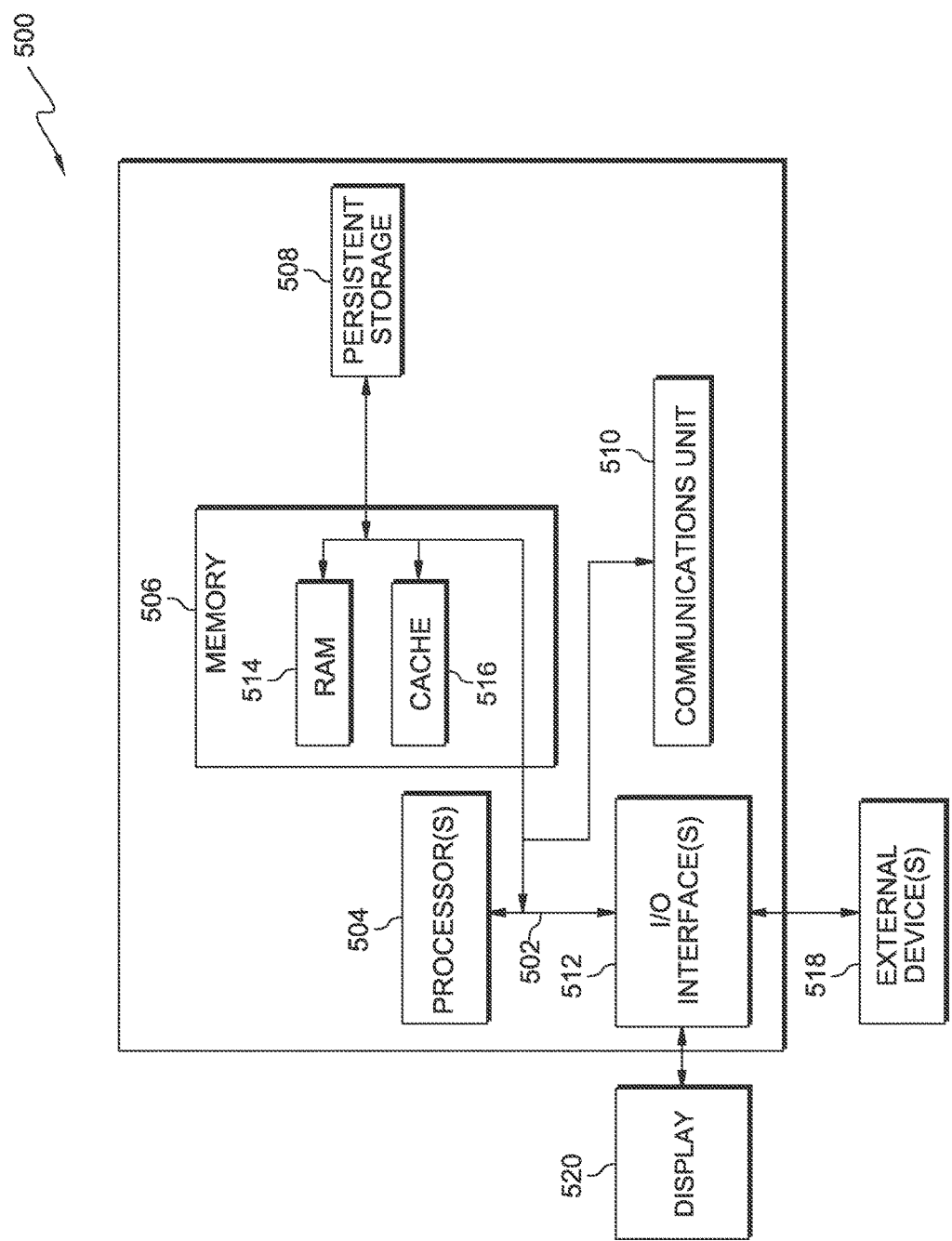
FIG. 5 depicts a block diagram of internal and external components of a data processing system, such as the computing device of FIG. 1, in accordance with an embodiment of the present invention.

FIG. 5 depicts a block diagram of components of computing device 102 and server 130, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 102 and server 130 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

The program's user interface 110 and smart specifications program 106 in computing device 102 and database 140 in server 130 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including between computing device 102 and schedule server 130. In these examples, communications unit 510 includes one or more network interface cards. Communications unit 510 may provide communications through the use of either or both physical and wireless communications links. The program's user interface 110 and smart specifications program 106 in computing device 102, and database 140 in schedule information server 130 may be downloaded to persistent storage 508 through communications unit 510.

I/O interface(s) 512 allows for input and output of data with other devices that may be connected to computing device 102 and server 130. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., the program's user interface 110 and smart specifications program 106 in computing device 102, and database 140 in schedule information server 130, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for evaluating specification data of two or more components, the method comprising:
  receiving, by one or more processors, informational data detailing two or more components;
  identifying, by one or more processors, a set of interactions among the two or more components by:
    receiving which entities within the two or more components interact with one another,
    receiving a user input, wherein the user input comprises instructions to ignore one or more interactions from the set of interactions,
    receiving a mode of communication by which components within the two or more components interact with each other, and
    receiving static and dynamic conditions associated with the mode of communication;

evaluating, by one or more processors, the informational data in conjunction with interactions within the two or more components;

determining, by one or more processors, from the two or more components whether one or more incompatibility issues exist based on the identified set of interactions; and responsive to determining that one or more incompatibility issues exist, indicating by one or more processors, through an interface, the one or more incompatibility issues, wherein the one of more incompatibility issues indicate at least one new incompatibility issue based on the identified set of interactions.

2. The method of claim 1, wherein receiving informational data detailing the two or more components comprises:

receiving, by one or more processors, a set of terms, wherein the set of terms comprises: a set of specifications associated with the two or more components and a general description of each entity of the two or more components.

3. The method of claim 1, wherein the set of interactions within the two or more components comprises at least second order interactions.

4. The method of claim 1, wherein evaluating the informational data in conjunction with interactions within the two or more components comprises:

calculating, by one or more processors, a set of parameters associated with a first specification and a second specification wherein the set of parameters are continuous or discrete; and comparing, by one or more processors, the first specification associated with a first component to the second specification associated with a second component.

5. The method of claim 1 wherein indicating through an interface the one or more incompatible issues comprises:

grouping, by one or more processors, incompatible components with each other; and outputting, by one or more processors, a description of a type of specification associated with the incompatible components.

* * * * *